United States Patent [19]
Dubroy

[11] Patent Number: 5,765,947
[45] Date of Patent: Jun. 16, 1998

[54] WIND-UP POT STIRRER HAVING SPRING TENSION AND GEAR TRAIN MECHANISM

[76] Inventor: Gary P. Dubroy, 6397 Frederica St., Niagara Falls, Ontario, Canada, L2G 1C5

[21] Appl. No.: 620,389

[22] Filed: Mar. 22, 1996

[51] Int. Cl.[6] .......................... B01F 7/20; A47J 43/044
[52] U.S. Cl. ........................ 366/249; 366/143; 99/348
[58] Field of Search ............................ 366/197, 143, 366/242–249, 252; 99/348

[56] References Cited

U.S. PATENT DOCUMENTS

| | | | |
|---|---|---|---|
| 270,015 | 1/1883 | Carter | 366/243 |
| 1,421,932 | 7/1922 | Foster | 366/249 X |
| 1,742,878 | 1/1930 | Rosenberg | 366/249 |
| 1,831,499 | 11/1931 | Losee | 366/249 |
| 2,001,036 | 5/1935 | Prince | 366/249 X |
| 2,007,361 | 7/1935 | Berger | 366/249 |
| 2,719,703 | 10/1955 | Boakes | 366/244 |
| 5,013,158 | 5/1991 | Tarlow | 99/348 X |
| 5,201,263 | 4/1993 | Teng | 366/247 X |
| 5,271,673 | 12/1993 | Bohnet et al. | 366/245 |

FOREIGN PATENT DOCUMENTS

| | | | |
|---|---|---|---|
| 24627 | 1/1931 | Australia | 366/249 |
| 370687 | 3/1923 | Germany | 366/249 |

Primary Examiner—Charles E. Cooley

[57] ABSTRACT

A wind-up pot stirrer, comprising, in combination, a lid. The lid is positionable over the upper edge of a pot with contents to be stirred. The lid has an upstanding annular wall with a central aperture centrally located in the lower surface of the lid. A lid cover has an imperforate upper wall and a downwardly extending cylindrical region with a cylindrical aperture extending downwardly through the central aperture of the lid to a region therebeneath. The cover has an exterior annular wall extending downwardly with a lower edge positionable against the upper surface of the lid. The cover is rotatable about a central axis with respect to the lid. An impeller has a vertical shaft positioned within the cylindrical aperture of the cover for rotation therein. The shaft has impeller blades at the lower extent thereof. The shaft and blades include a spring-biased gear train mechanism. The shaft has an upper end with a vertically disposed slot. A C-shaped corral extends upwardly from the upper surface of the lid with an opening facing the impeller located within the chamber and a rotatable shaft located within the corral.

8 Claims, 5 Drawing Sheets

WIND-UP POT STIRRER HAVING SPRING TENSION AND GEAR TRAIN MECHANISM

BACKGROUND OF THE INVENTION

1. Field of the Invention

The present invention relates to a wind-up pot stirrer and, more particularly, pertains to automatically stir the contents of a pot through a self-contained wind-up motor in the lid which drives a stirring impeller at a preselected speed.

2. Description of the Prior Art

The use of lids for pots and pans as well as stirring devices of various designs and configurations are known in the prior art. More specifically, lids for pots and pans as well as stirring devices of various designs and configurations heretofore devised and utilized for the purpose of simplifying the cooking process through various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art disclosed in U.S. Pat. No. 5,372,422 to Dubroy discloses an apparatus for automatically stirring food during cooking.

U.S. Pat. No. 4,822,172 to Stottman discloses an electric food mixer with three operator selected modes based on an internal timer and a motor speed controller.

U.S. Pat. No. 4,922,464 to Kamprath discloses a portable mixer for processing food.

U.S. Pat. No. 4,936,688 to Cornell discloses a food stirring apparatus.

U.S. Pat. No. 5,000,578 to Artin et al. discloses a food mixing appliance for mixing foods or other materials using a pair of mixing implements.

U.S. Pat. No. Des. 323,955 to Rixen discloses the ornamental design for a portable electric food mixer.

U.S. Pat. No. Des. 309,081 to Thomas discloses the ornamental design of a portable electric food mixer.

In this respect, the wind-up pot stirrer according to the present invention substantially departs from the conventional concepts and designs of the prior art, and in so doing provides an apparatus primarily developed for the purpose of automatically stir the contents of a pot through a self-contained wind-up motor in the lid which drives a stirring impeller at a preselected speed.

Therefore, it can be appreciated that there exists a continuing need for new and improved wind-up pot stirrer which can be used for automatically stir the contents of a pot through a self-contained wind-up motor in the lid which drives a stirring impeller at a preselected speed. In this regard, the present invention substantially fulfills this need.

SUMMARY OF THE INVENTION

In view of the foregoing disadvantages inherent in the known types of lids for pots and pans as well as stirring devices of various designs and configurations now present in the prior art, the present invention provides an improved wind-up pot stirrer. As such, the general purpose of the present invention, which will be described subsequently in greater detail, is to provide a new and improved line-up pot stirrer apparatus and method which has all the advantages of the prior art and none of the disadvantages.

To attain this, the present invention essentially comprises a wind-up pot stirrer, comprising, in combination, a lid. The lid is positionable over the upper edge of a pot with contents to be stirred. The pot is of the type having an upper edge in a circular configuration. The lid is formed in a generally planar configuration with an annular outer rim and with an interior section formed of eccentric steps. Each step has a horizontal component and a vertical component to provide a plurality of annular surfaces positionable upon the upper edge of a pot with contents to be stirred as a function of the diameter of the upper edge of the pot. The lid has an upstanding annular wall to define a chamber thereabove with a central aperture centrally located in the lower surface of the lid. A lid cover of a circular configuration has an imperforate upper wall and a downwardly extending cylindrical region with a cylindrical aperture extending downwardly through the central aperture of the lid to a region therebeneath. The cover has an exterior annular wall extending downwardly with a lower edge positionable against the upper surface of the lid. The cover has a central axis essentially coextensive with the central axis of the lid and is rotatable about the central axis with respect to the lid. An impeller has a vertical shaft positioned within the cylindrical aperture of the cover for rotation therein. The shaft has impeller blades at the lower extent thereof for rotation and stirring of the contents of the pot. The shaft has an upper end with a vertically disposed slot. A C-shaped corral extends upwardly from the upper surface of the lid with an opening facing the impeller located within the chamber and a rotatable shaft located within the corral having an ending formed with a vertical slot. A coil-shaped leaf spring has an interior end and an exterior end located within the corral with an interior end located within the slot of the freely rotatable shaft within the corral and with its exterior end located within the slot of the impeller. The coil-spring has a rectangular cross sectional configuration and is biased to return to a rest position on the freely rotatable shaft within the corral whereby upon rotation of the cover with respect to the lid, the free end of the spring will be drawn from the freely rotatable shaft to a location spiraling around the impeller to thereby provide a force from the spring to recoil around the freely rotatable shaft and thereby rotate the impeller with respect to the lid. At least one gear train is provided and has vertical support shafts secured within the housing remote from the spring with an exterior gear having inwardly facing teeth rotatable engageable with the teeth of the exteriormost gear whereby the gear train will provide a retarding force to limit the speed of rotation of the cover and impeller. A supplemental gear train is also provided in the chamber. Such supplemental gear train has an exteriormost gear, an intermediate gear and an innermost impeller coupled with respect to each other. The exteriormost gear is movable through a pin extending upwardly through a slot whereby the pin and exteriormost gear of the second gear train may be moved into a position with the interior teeth of the lid providing a reduced retardation force for high speed rotation of the impeller and a position remote from the teeth of the lid whereby the teeth of the exteriormost gear will contact the teeth of the interiormost gear of the first gear train for providing a high retardation force for a low speed of rotation of the impeller. A lever is pivotally mounted in an aperture in the side wall of the cover and is rotatable to a position wherein its innermost edge contacts the teeth on the exterior surface of the upstanding annular wall of the lid to preclude rotation of the lid with respect to the cover and a second position wherein the interiormost edge of the lever is out of contact with the teeth on the upstanding annular surface of the lid to allow free rotation of the cover with respect to the lid for rotating the impeller. A finger extends downwardly from the lower surface of the lid adjacent to its peripheral edge adapted to engage the handle of the pot supporting the lid to preclude rotation of the lid with respect to the pot. An aperture is formed in the lid adjacent to a peripheral edge thereof and is adapted to allow viewing of the contents of the pot when the lid is located on the pot with an associated window between a closed orientation to cover the aperture in an open orientation remote from the aperture to allow viewing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wind-up pot stirrer which has all the advantages of the prior art lids for pots and pans as well as stirring devices of various designs and configurations and none of the disadvantages.

It is another object of the present invention to provide a new and improved wind-up pot stirrer which may be easily and efficiently manufactured and marketed.

It is a further object of the present invention to provide a new and improved wind-up pot stirrer which is of a durable and reliable construction.

An even further object of the present invention is to provide a new and improved wind-up pot stirrer which is susceptible of a low cost of manufacture with regard to both materials and labor, and which accordingly is then susceptible of low prices of sale to the consuming public, thereby making such lids for pots and pans as well as stirring devices of various designs and configurations economically available to the buying public.

Still yet another object of the present invention is to provide a new and improved wind-up pot stirrer which provides in the apparatuses and methods of the prior art some of the advantages thereof, while simultaneously overcoming some of the disadvantages normally associated therewith.

Still another object of the present invention is to automatically stir the contents of a pot through a self-contained wind-up motor in the lid which drives a stirring impeller at a preselected speed.

Lastly, it is an object of the present invention to provide a new and improved wind-up pot stirrer, comprising, in combination, a lid. The lid is positionable over the upper edge of a pot with contents to be stirred. The pot is of the type having an upper edge in a circular configuration. The lid is formed in a generally planar configuration with an annular outer rim and with an interior section formed of eccentric steps. Each step has a horizontal component and a vertical component to provide a plurality of annular surfaces positionable upon the upper edge of a pot with contents to be stirred as a function of the diameter of the upper edge of the pot. The lid has an upstanding annular wall to define a chamber thereabove with a central aperture centrally located in the lower surface of the lid. A lid cover of a circular configuration has an imperforate upper wall and a downwardly extending cylindrical region with a cylindrical aperture extending downwardly through the central aperture of the lid to a region therebeneath. The cover has an exterior annular wall extending downwardly with a lower edge positionable against the upper surface of the lid. The cover has a central axis essentially coextensive with the central axis of the lid and is rotatable about the central axis with respect to the lid. An impeller has a vertical shaft positioned within the cylindrical aperture of the cover for rotation therein. The shaft has impeller blades at the lower extent thereof for rotation and stirring of the contents of the pot. The shaft has an upper end with a vertically disposed slot. A C-shaped corral extends upwardly from the upper surface of the lid with an opening facing the impeller located within the chamber and a rotatable shaft located within the corral having an ending formed with a vertical slot.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
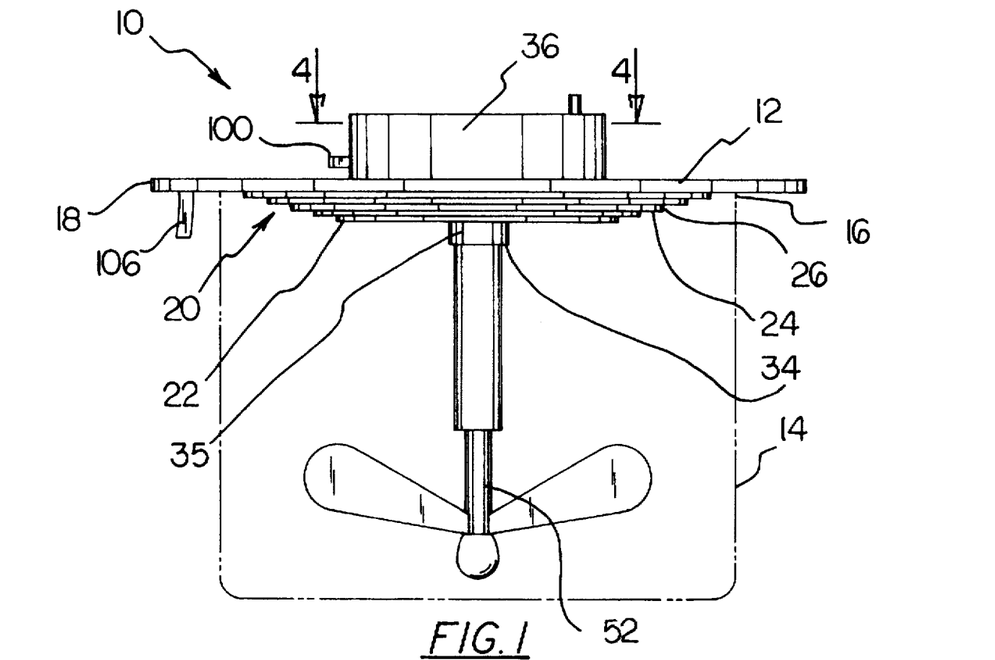
FIG. 1 is a side elevational view of the preferred embodiment of the wind-up pot stirrer constructed in accordance with the principles of the present invention.
Figure 2:
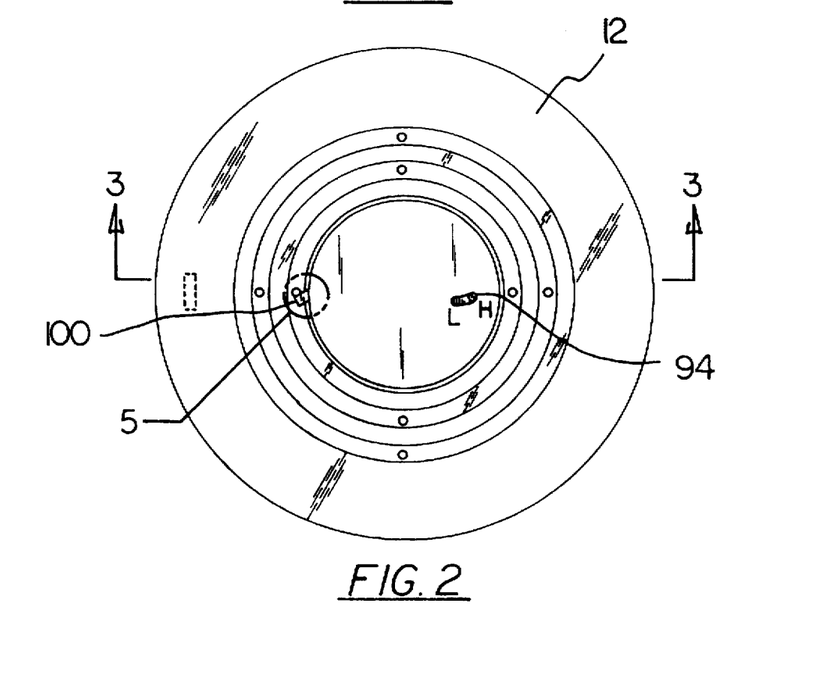
FIG. 2 is a top elevational view of the stirrer shown in FIG. 1.
Figure 3:
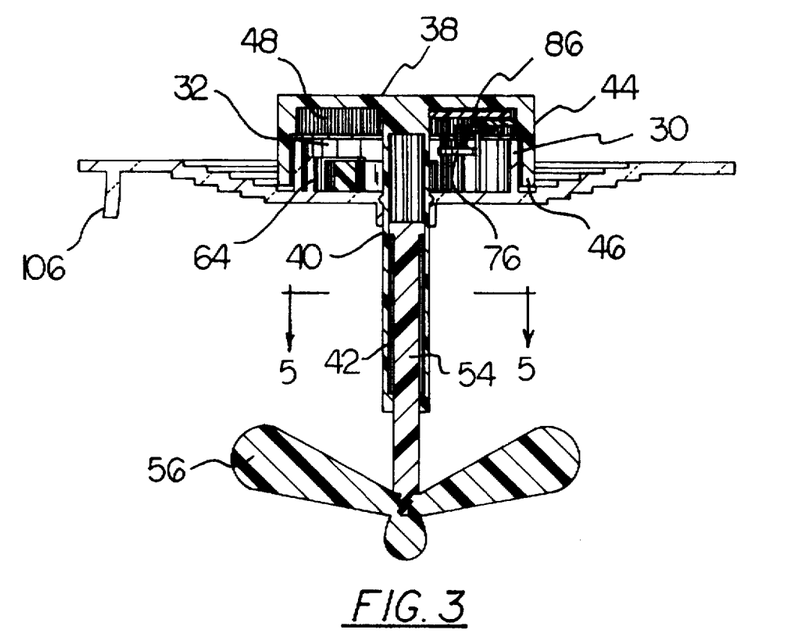
FIG. 3 is a vertical cross sectional view taken centrally through the device of the prior Figures taken along line 3—3 of FIG. 2.
Figure 4:
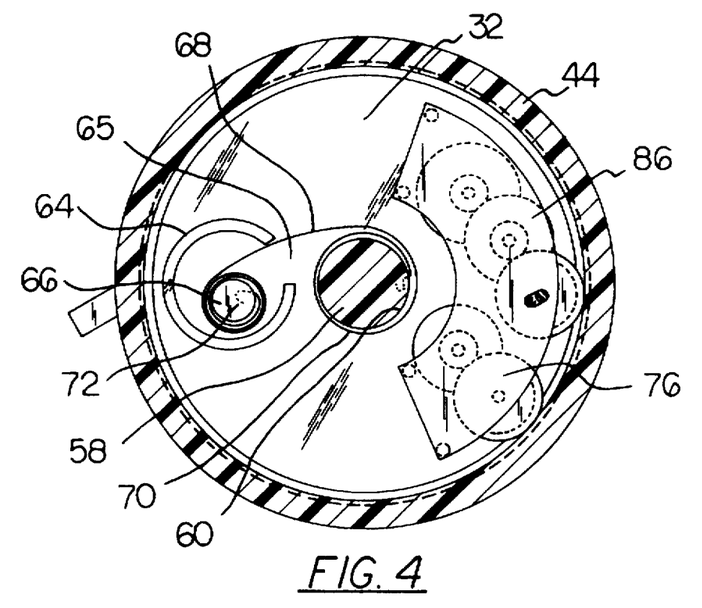
FIG. 4 is a horizontal cross sectional view taken along line 4—4 of FIG. 1.
Figure 5:
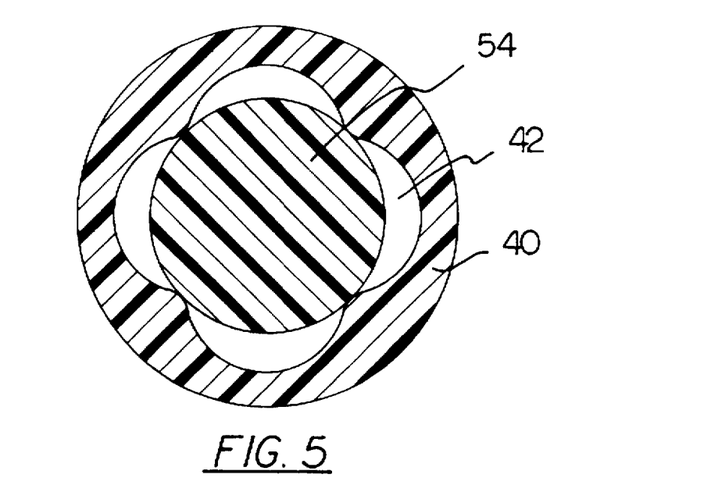
Figure 6:
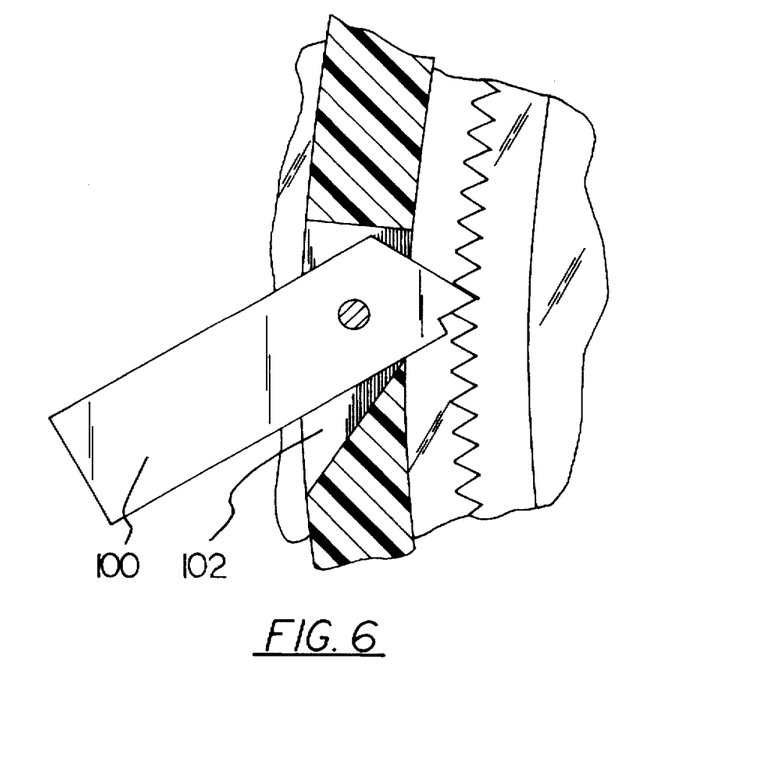
FIG. 6 is an enlarged cross sectional view showing the stop lever taken at circle 5 of FIG. 2.
Figure 7:
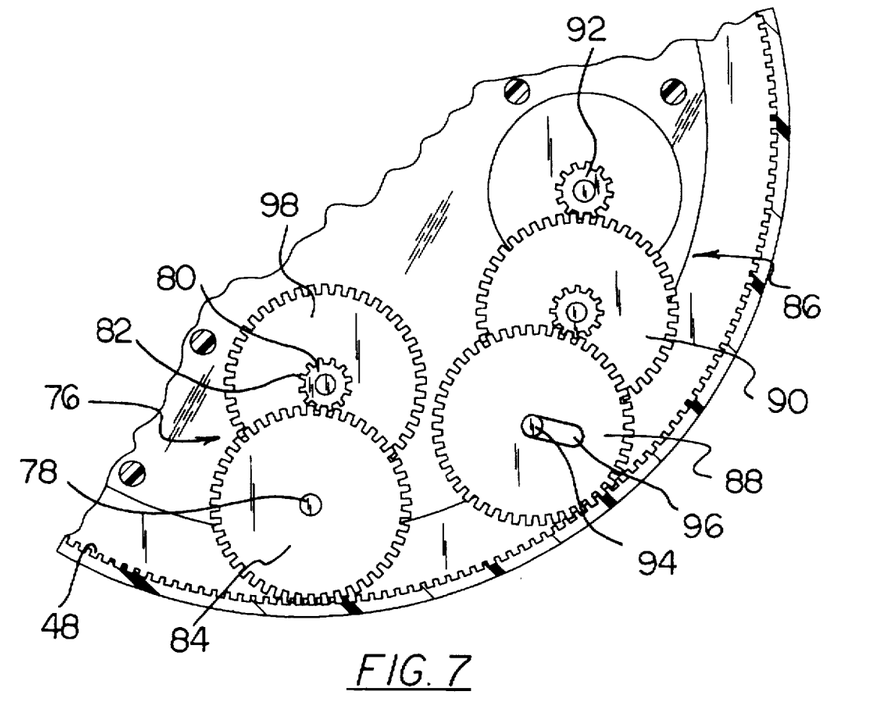
FIG. 7 is an enlarged plan view of the gear assembly shown in FIGS. 3 and 4.
Figure 8:
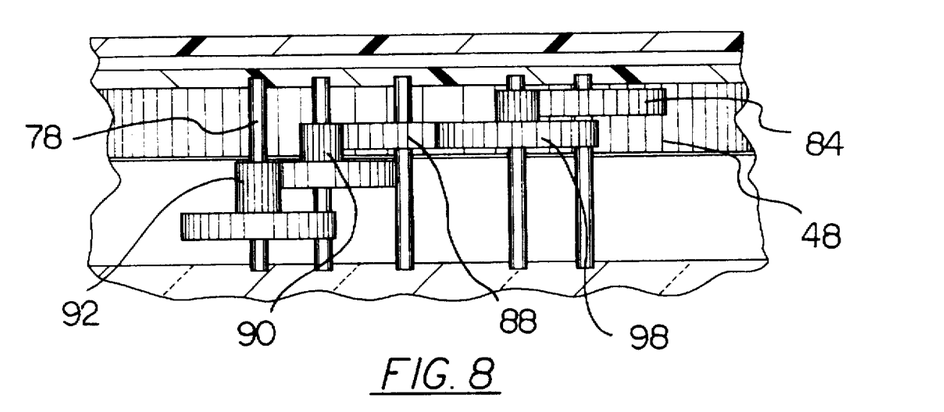
FIG. 8 is a side elevational view of the gears shown in FIG. 7.

With reference now to the drawings, and in particular to FIG. 1 thereof, a new and improved wind-up pot stirrer embodying the principles and concepts of the present invention and generally designated by the reference numeral 10 will be described.

The present invention, the new and improved wind-up pot stirrer, is comprised of a plurality of components. Such components in their broadest context include a lid, a lid cover, an impeller, a C-shaped corral and a coil-shaped leaf spring. Such components are individually configured and correlated with respect to each other so as to attain the desired objective.

The present invention is a system 10. Such system 10 includes a lid 12. Such lid is positionable over the upper edge of a pot 14 with contents to be stirred within the pot 14. The pot is of the type which has an upper edge 16 in a circular configuration. The lid is formed in a generally planar configuration with an annular outer rim 18 and with an interior section 20 formed of concentric steps 22. Each step has a horizontal component 24 and a vertical component 26. Such components are to provide a plurality of annular surfaces. Such surfaces are positionable upon the upper edge of a pot 14 with contents to be stirred as a function of the diameter of the upper edge of the pot. The concentric steps 22 allow the system 10 to be incorporated into pots of varying diameters. The lid 12 has an upstanding annular wall 30. Such wall is to define a chamber 32 thereabove with a central aperture 34 centrally located in the lower surface of the lid. An annular wall 35 extends downwardly from the central aperture 34.

Next provided in the system 10 is a lid cover 36. Such lid cover 36 is of a circular configuration and has an imperforate upper wall 38 and a downwardly extending cylindrical region 40 with a cylindrical aperture 42. Such aperture extends downwardly through the central aperture 34 of the lid to a region therebeneath. The cover 36 has an exterior annular wall 44. Such wall extends downwardly with a lower edge 46 positionable against the upper surface of the lid. The exterior annular wall 44 has teeth 48 disposed thereon. The cover 36 has a central axis essentially coextensive with the central axis of the lid 12 and is rotatable about the central axis with respect to the lid 12.

Next provided in the system 10 of the present invention is an impeller 52. The impeller has a vertical shaft 54. The vertical shaft 54 is positioned within the cylindrical aperture 42 of the cover 36 for rotation therein. The shaft 54 has impeller blades 56 at a lower extent thereof for rotation and stirring of the contents of the pot 14. The shaft 54 has an upper end 58. The upper end 58 has a vertically disposed slot 60.

Another major component of the system 10 is a C-shaped corral 64. Such corral 64 extends upwardly from the upper surface of the lid 12 with an opening 65 facing the shaft 54 located within the chamber 32 and a rotatable post 66 located within the corral 64 which has an ending formed with a vertical slot.

Another major component of the system 10 of the present invention is a coil-shaped leaf spring 68. Such spring has an interior end 70. The spring also has an exterior end 72. The exterior end 72 is located within the corral 64 located within the slot of the freely rotatable post 66 within the corral 64.

The exterior end 72 is located within the slot 60 of the shaft 54 of the impeller 52. The leaf-spring 68 has a rectangular cross sectional configuration and is biased to return to a rest position on the freely rotatable post 66 within the corral 64 whereby, upon rotation of the lid cover 36 with respect to the lid 12, the exterior end 72 of the spring 68 will be drawn from the freely rotatable post 66 to a location spiraling around the shaft 54 of the impeller 52 to thereby provide a force from the spring 68 to recoil around the freely rotatable post 66 and thereby rotate the impeller 52 with respect to the lid 12.

Next provided is at least one gear train 76. Such gear train has vertical support shafts 78. The support shafts are secured within the chamber 32 remote from the spring with an exterior gear 80. The exterior gear has inwardly facing teeth 82. Such facing teeth are rotatable and engageable with the teeth of the exteriormost gear 84 whereby the gear train will provide a retarding force to limit the speed of rotation of the cover and impeller.

A supplemental gear train 86 is also provided in the chamber. Such supplemental gear train has an exteriormost gear 88. It also has an intermediate gear 90 and an innermost gear 92. The intermediate gear and innermost gear are coupled with respect to each other. The exteriormost gear is movable through a pin 94. Such pin extends upwardly through a slot 96 whereby the pin and the exteriormost gear of the second gear train may be moved into a position with the interior teeth 48 of the lid cover 36. This provides a reduced retardation force for high speed rotation of the impeller and a position remote from the teeth 48 of the lid cover 36 whereby the teeth of the exteriormost gear 88 will contact the teeth of the interiormost gear 98 of the first gear train 76 for providing a high retardation force for a low speed of rotation of the impeller.

Further provided in the system 10 of the present invention is a lever 100. Such lever is pivotally mounted in an aperture 102 in the annular wall of the lid cover. It is rotatable to a position wherein its innermost edge contacts the teeth on the exterior surface of the upstanding annular wall of the lid to preclude rotation of the lid with respect to the lid cover and a second position wherein the interiormost edge of the lever 100 is out of contact with the teeth on the upstanding annular surface of the lid to allow free rotation of the lid cover with respect to the lid 12 for rotating the impeller 52.

A finger 106 extends downwardly from the lower surface of the lid adjacent to its peripheral edge which is adapted to engage the handle of the pot supporting the lid to preclude rotation of the lid with respect to the pot.

Lastly provided in the system 10 of the present invention is an aperture 108. Such aperture is formed in the lid adjacent to a peripheral edge thereof and is adapted to allow viewing of the contents of the pot when the lid is located on the pot. The aperture has an associated window 110. Such window is located between a closed orientation to cover the aperture in an open orientation remote from the aperture to allow viewing.

Figure 9:
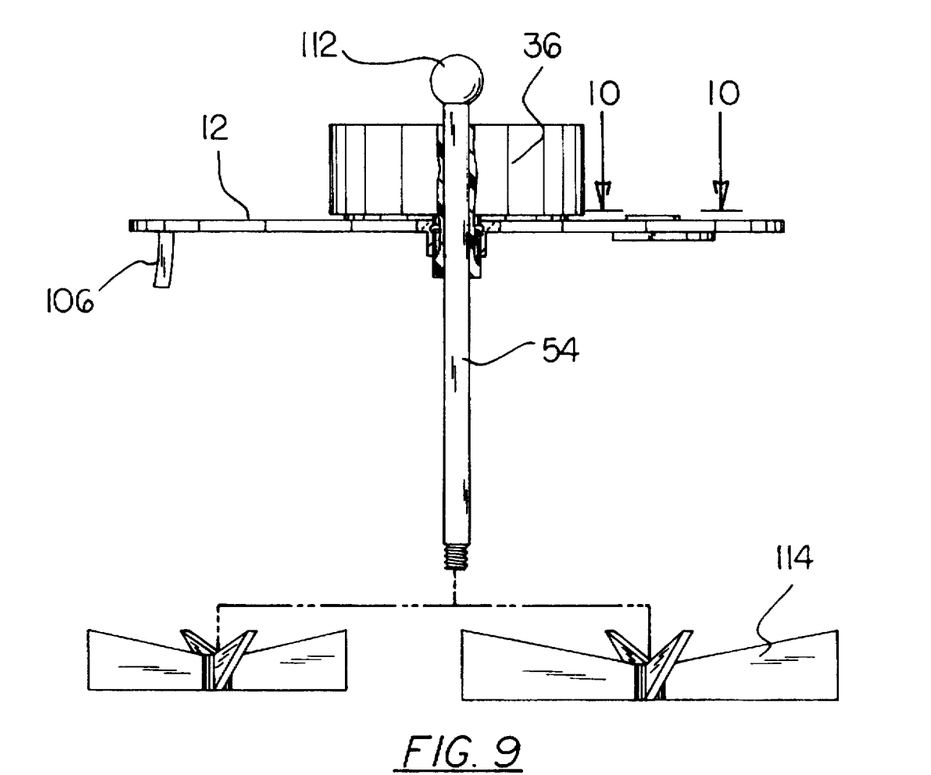
FIG. 9 is a side elevational view partly in cross section illustrating an alternate design of the present invention demonstrating the use of alternate types of impellers.
Figure 10:
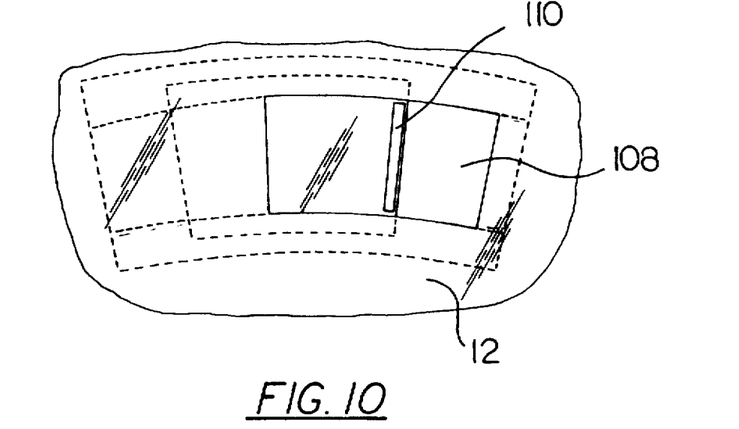
FIG. 10 is a plan view of a portion of cross-section shown in FIG. 9 along line 10—10 to illustrate a viewing window.

In an alternate embodiment, as best viewed in FIG. 9, the shaft 54 of the impeller 52 extends upwardly through the lid 12 and the lid cover 36 and terminates in a grasping knob 112. The grasping knob 112 allows a user to manually turn the impeller 52 to wind the spring 68 around the shaft 54 whereby release of the grasping knob 112 will cause the spring 68 to rotate the impeller 52 with respect to the lid 12. Additionally, Figure 9 illustrates the use of impeller blades 114 which are removable with respect to the shaft 54. Such a feature allows for the easy cleaning and c hanging of the blades.

The present invention can include many significant optional features. By way of example, it can include a see through sliding vent, a toggle safety switch, a step down container with size hooking feature, side spring lock adjustable clamps, stagnated locator pins on separate levels for container size, detachable lid and motor sections, riding knob on bottom of telescoping shaft, small tab to fit on hole in lid section for use as cooking lid, easily removed telescoping shaft from lid action if caught in substance, motor section having air gap between lid section for cooking and insulation, telescoping shaft can have suction c up top to hook on roof of microwave to stir foods with revolving table inside microwave, stirrer rest on bars across paint can with swivel joint to stir substance on an angle, varied fin designs, bandable fin designs that an be manipulated to various shapes, and a side telescoping version to adjust to various size containers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wind-up pot stirrer, comprising, in combination:

a lid positionable upon a pot with contents to be stirred therein, the pot being of the type having an upper edge in a circular configuration, the lid being formed in a generally planar configuration with an annular outer rim and with an interior section formed of concentric steps, each step having a horizontal component and a vertical component to provide a plurality of annular surfaces positionable upon the upper edge of the pot with contents to be stirred, the lid contacting the pot at one of the steps as a function of the diameter of the upper edge of the pot, the lid having an upstanding annular wall at an intermediate region thereof to define a chamber thereabove and with a central aperture centrally located through the lid;

a lid cover in a cylindrical configuration having an imperforate circular upper wall and a downwardly extending cylindrical extension extending downwardly through the central aperture of the lid to a region therebeneath, the lid cover having an exterior annular wall extending downwardly from a periphery of the upper wall with a lower edge positionable against an upper surface of the lid around the upstanding annular wall thereof, the exterior annular wall having teeth formed on an interior surface thereof, the lid cover having a central axis essentially coextensive with a central axis of the lid and being rotatable with respect to the lid;

an impeller-having a vertical shaft positioned within the cylindrical extension of the lid cover for rotation therewithin, the shaft having impeller blades at the lower extent thereof for rotation and stirring of the contents of the pot, the shaft having an upper end with a vertically disposed slot;

a C-shaped corral extending upwardly from the upper surface of the lid within the chamber with an opening facing the shaft and a freely rotatable post located within the corral, the freely rotatable post having a vertical slot;

a leaf spring having an essentially rectangular cross section and having an exterior end and an interior end, the leaf spring located within the corral with the exterior end located within the slot of the freely rotatable post and with the interior end located within the slot of the shaft of the impeller, the leaf spring being resiliently biased to return to a rest position on the freely rotatable post whereupon rotation of the lid cover with respect to the lid, the exterior end of the spring will be sequentially drawn from the freely rotatable post to a location spiraling around the shaft to thereby provide a force to recoil the spring around the freely rotatable post and thereby rotate the cover and shaft and blades with respect to the lid;

a first gear train having vertical support shafts secured within the chamber remote from the leaf spring and including an exterior gear having teeth rotatably engaged with the teeth on the lid cover whereby the first gear train will provide a retarding force to limit speed of rotation of the lid cover and impeller;

a supplemental gear train also being rotatable within the chamber, remote from the spring, and including an exteriormost gear, an intermediate gear and an interiormost gear coupled with respect to each other, the exteriormost gear having an axis movable through a pin extending upwardly through a slot in the lid cover whereby the pin and exteriormost gear of the supplemental gear train may be moved into a position in contact with the teeth of the lid cover providing a reduced retardation force for high speed rotation of the impeller and a position remote from the teeth of the lid cover whereby the teeth of the exteriormost gear will contact teeth of an interiormost gear of the first gear train for providing a high retardation force for a low speed of rotation of the impeller;

a lever pivotally mounted in an aperture in the exterior annular wall of the lid cover and rotatable to a position wherein an innermost edge of the lever contacts teeth on the lid to preclude rotation of the lid cover with respect to the lid and a second position wherein the innermost edge of the lever is out of contact with the teeth on the lid to allow free rotation of the lid cover with respect to the lid for rotating the impeller;

a finger extending downwardly from a lower surface of the lid adjacent to the outer rim thereof adapted to engage a handle of the pot supporting the lid to preclude rotation of the lid with respect to the pot; and an aperture formed in the lid adjacent to the outer rim thereof adapted to allow viewing of the contents of the pot when the lid is located on the pot and further including an associated window slidable between a closed orientation to cover the aperture and an open orientation remote from the aperture to allow viewing of the contents of the pot when the lid is located on the pot.

2. A wind-up pot stirrer, comprising:
- a lid positionable over an upper edge of a pot, the lid having an upstanding annular wall to define a chamber thereabove with a central aperture therethrough centrally located in the lid;
- a lid cover having an imperforate upper wall and a downwardly extending cylindrical region with a cylindrical aperture extending downwardly through the central aperture of the lid to a region therebeneath, the lid cover having an exterior annular wall extending downwardly with a lower edge positionable against an upper surface of the lid, the lid cover being rotatable about a central axis with respect to the lid;
- an impeller having a vertical shaft positioned within the cylindrical aperture of the lid for rotation therein, the shaft having impeller blades at a lower extent thereof for rotation and stirring of contents of the pot;
- a C-shaped corral extending upwardly from the upper surface of the lid with an opening facing the shaft located within the chamber and a rotatable post located within the corral; and
- a leaf spring having an exterior end located within the corral, the exterior end of the leaf spring coupled with a freely rotatable post within the corral, the leaf spring further having an interior end coupled with the shaft.

3. The device as set forth in claim 2 and further including at least one gear train having vertical support shafts secured within the chamber remote from the leaf spring with an exterior gear having inwardly facing teeth rotatably engageable with teeth of the lid cover whereby the gear train will provide a retarding force to limit a speed of rotation of the lid cover and impeller.

4. The device as set forth in claim 3 and further including a supplemental gear train also being provided in the chamber, such supplemental gear train having an exteriormost gear, an intermediate gear and an interiormost gear coupled with respect to each other, the exteriormost gear movable through a pin extending upwardly through a slot in the lid cover whereby the pin and exteriormost gear of the supplemental gear train may be moved into a position with the teeth of the lid cover providing a reduced retardation force for high speed rotation of the impeller and a position remote from the teeth of the lid cover whereby teeth of the exteriormost gear will contact teeth of an interiormost gear of the first gear train for providing a high retardation force for a low speed of rotation of the impeller.

5. The device as set forth in claim 2 and further including a lever pivotally mounted in an aperture in the exterior annular wall of the lid cover and rotatable to a position whereby an innermost edge of the lever contacts a plurality of teeth formed on an exterior surface of the upstanding annular wall of the lid to preclude rotation of the lid cover with respect to the lid and a second position wherein the innermost edge of the lever is out of contact with the teeth on the upstanding annular wall of the lid to allow free rotation of the lid cover with respect to the lid for rotating the impeller.

6. The device as set forth in claim 2 and further including a finger extending downwardly from a lower surface of the lid adjacent to an outer rim thereof adapted to engage a handle of the pot supporting the lid to preclude rotation of the lid with respect to the pot.

7. The device as set forth in claim 2 and further including an aperture formed in the lid adjacent to an outer rim thereof adapted to allow viewing of contents of the pot when the lid is located on the pot with an associated window in a closed orientation to cover the aperture and in an open orientation remote from the aperture to allow viewing of the contents within the pot.

8. The device as set forth in claim 2 wherein the lid further including an interior section formed of concentric steps, each step having a horizontal component and a vertical component to provide a plurality of annular surfaces positionable upon the upper edge of the pot with contents to be stirred, the lid contacting the pot at one of the steps as a function of the diameter of the upper edge of the pot.

* * * * *